United States Patent [19]
Shu et al.

[11] Patent Number: 5,608,515
[45] Date of Patent: Mar. 4, 1997

[54] DOUBLE WINDOW FOR PROTECTING OPTICAL SENSORS FROM HAZARDOUS ENVIRONMENTS

[75] Inventors: Emily Y. Shu; Dale M. Brown, both of Schenectady; Louis J. Petrucco, Albany, all of N.Y.

[73] Assignee: General Electric Company, Schenectady, N.Y.

[21] Appl. No.: 425,548

[22] Filed: Apr. 20, 1995

[51] Int. Cl.⁶ .............................. G01J 5/48; G01N 21/00
[52] U.S. Cl. .............................. 356/43; 356/44; 356/440
[58] Field of Search .............................. 356/43–44, 440, 356/436–439; 359/507, 513, 511

[56] References Cited

U.S. PATENT DOCUMENTS

| | | | |
|---|---|---|---|
| 4,657,385 | 4/1987 | Pointer | 356/43 |
| 5,257,496 | 11/1993 | Brown et al. | 60/39.06 |
| 5,303,684 | 4/1994 | Brown et al. | 73/116 |
| 5,378,642 | 1/1995 | Brown et al. | 437/40 |
| 5,394,005 | 2/1995 | Brown et al. | 257/461 |

Primary Examiner—Frank Gonzalez
Assistant Examiner—Jason D. Eisenberg
Attorney, Agent, or Firm—Ann M. Agosti; Marvin Snyder

[57] ABSTRACT

An optical sensor system includes a housing having an open end; first and second windows situated in the housing; a fastener for situating the first window closer to the open end than the second window and permitting an air exchange between a sensing region and the second window; a hermetic seal between the second window and the housing; and an optical sensor situated between the second window and a wall of the housing such that the air exchange does not occur inside the optical sensor. The first and second windows can include materials selected from the group consisting of sapphire, quartz, and glass; the optical sensor to be protected can include silicon carbide; and the sensing region can include a combustion region. If the sensing region includes a combustion region, the first window is situated at a location in the housing sufficiently near enough to the combustion region to vaporize hydrocarbons in the vicinity of the first window, and the second window is situated a location sufficiently far enough from the combustion region so that the hermetic seal remains stable.

15 Claims, 1 Drawing Sheet

DOUBLE WINDOW FOR PROTECTING OPTICAL SENSORS FROM HAZARDOUS ENVIRONMENTS

BACKGROUND OF THE INVENTION

1. Field of the Invention

The present invention relates generally to optical sensors and more particularly to windows for protecting optical sensors in hazardous environments.

2. Description of the Related Art

Optical sensors are used for in situ or on-line monitoring of applications in hazardous environments because of they are nonintrusive and can be highly sensitive. Combustion diagnosis using silicon carbide (SIC) flame sensors has been disclosed in commonly assigned Brown et al., U.S. Pat. No. 5,257,496, for example. Combustion flame temperature and dynamics of gas and oil fired turbines have been measured by high temperature SiC flame sensors. The signals produced by the optical sensors are well-correlated to conventional measurement devices such as thermocouples for temperature, mass spectrometers for nitrogen oxides (NOx), and pressure sensors for dynamics. SiC optical sensors are advantageous because they have the potential for highly reliable remote sensing of the optical emissions from the combustion process whereas direct contact sensors such as the conventional measurement devices sometimes become damaged by harsh conditions in the combustors.

An optical sensor can have a window shielding it from the sensed environment. One difficulty challenging flame sensor and optical sensing applications is that the window can become coated with combustion soot. The transmission of the window directly affects the light received by the photodetector, causing calibration change and loss of signal.

Another technical difficulty is the high temperature limit on the integrity of hermetic bonding between optical translucent window material for ultraviolet, visible, or infrared light, and the sensor housing which typically comprises metal. Conventional brazing technology for sapphire or quartz with metal guarantees up to 400° C. or lower for high differential pressures such as in gas turbines where 250 pounds per square in inch can be normal. The temperature of 400° C., however, is not hot enough to induce self-burning of all carbon deposits. Therefore, it is not possible to keep the hermetically sealed window from soot deposit for flame sensors next to the combustors.

SUMMARY OF THE INVENTION

Accordingly, an object of one embodiment of the present invention to provide an optical window system capable of withstanding high temperatures and having minimal soot.

The present invention provides a double window design for shielding and sealing optical sensors used in combustion diagnosis. This design is particularly advantageous for optical sensors that have to perform reliably in extremely high temperature, high pressure, and dirty environments such as those in the gas turbine or aircraft engine fields. In the invention, a nonhermetically sealed first window, which can be situated in or near the combustor where the temperature is high enough to vaporize any hydrocarbon, acts as a self-cleaning shielding window. A second window, which is pressure sealed, protects the detector and maintains the combustor pressure.

Briefly, in accordance with one embodiment of the invention, an apparatus for protecting an optical sensor comprises a housing having an open end and first and second windows situated in the housing. The first window is situated closer to the open end than the second window and permits air exchange between an outside environment and the second window. The second window is hermetically sealed to the housing.

In accordance with another embodiment of the invention, an optical sensor system comprises a housing having an open end; first and second windows situated in the housing; a fastener for situating the first window closer to the open end than the second window and permitting an air exchange between a sensing region and the second window; a hermetic seal between the second window and the housing; and an optical sensor situated between the second window and a wall of the housing such that the air exchange does not occur inside the optical sensor. The first and second windows may comprise materials selected from the group consisting of sapphire, quartz, and glass; the optical sensor to be protected may comprise silicon carbide; and the sensing region may comprise a combustion region. If the sensing region comprises a combustion region, the first window is situated at a location in the housing sufficiently near enough to the combustion region to vaporize hydrocarbons in the vicinity of the first window, and the second window is situated a location sufficiently far enough from the combustion region so that the hermetic seal remains fixed (i.e., is not destroyed).

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
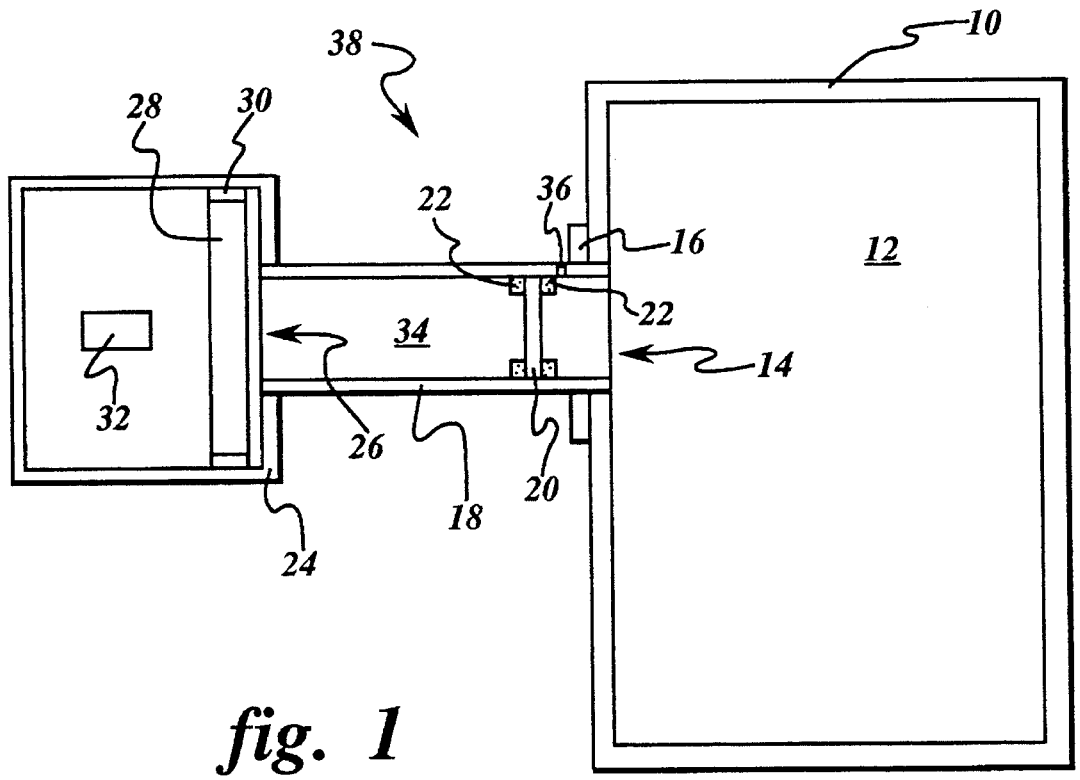
FIG. 1 is a sectional side view of an embodiment of the present invention.

FIG. 1 is a sectional side view of an embodiment of the present invention. Chamber 10 encloses a high temperature environment 12. Chamber 10 may house a region wherein high temperatures and/or pressures are present. For example, chamber. 10 may comprise a combustor for an aircraft engine, gas turbine, or boiler burner. In another example, chamber 10 may house a region for chemical vapor deposition processing. The material of chamber 10 may comprise a metal or metal alloy capable of withstanding high temperatures. In one embodiment, the material is stainless steel coated on the interior with a thermal barrier coating. Thermal barrier coatings generally comprise chemically stabilized ceramic materials, such as, for example, yitria stabilized zirconia.

Figure 2:
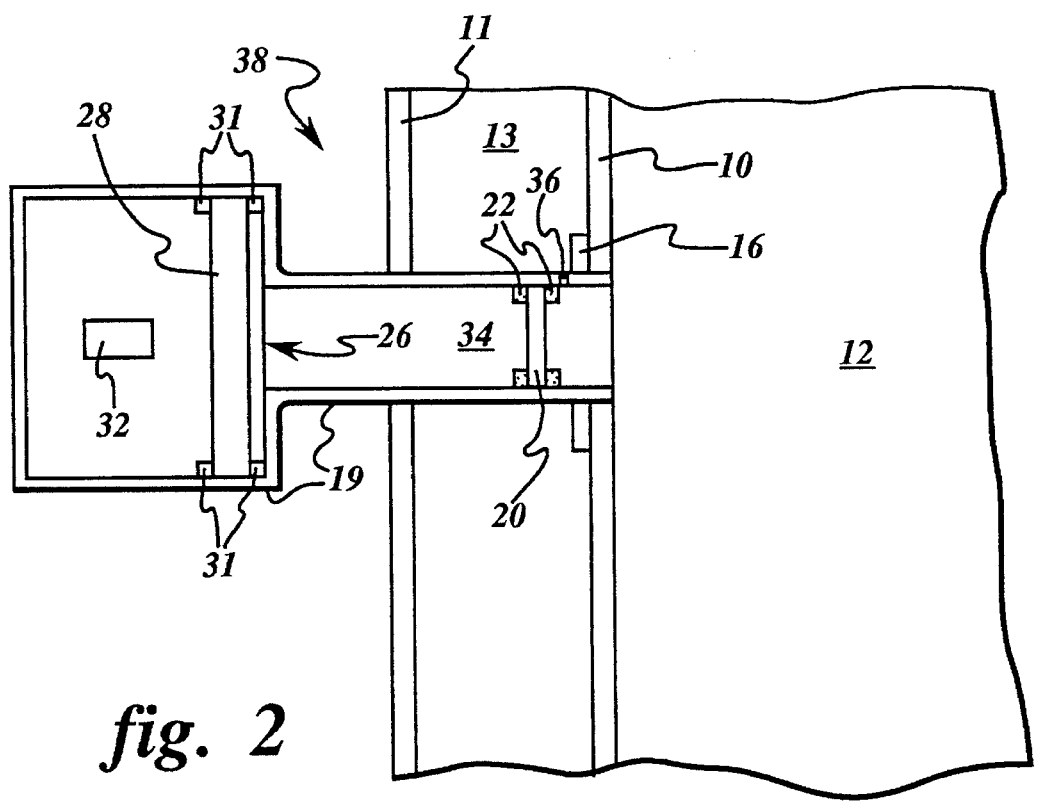
FIG. 2 is a sectional side view of another embodiment of the invention.

Chamber 10 has an opening 14 and a corresponding port 16 to permit insertion of the optical sensor system 38. Port 16 comprises a material similar to that of the chamber. The optical sensor system includes a first housing 18 having a first window 20 and a second housing 24 having a second window 28 and an optical sensor device 32. Although first and second housings are shown in FIG. 1, a single housing can be used to hold both windows and the optical sensor, as shown in FIG. 2.

The first and second housings comprise temperature resistant materials which can be welded together, such as appropriately coated stainless steel, for example. In one embodiment, the first and second housings are cylindrically shaped.

First housing 18 has one open end extending to or through chamber opening 14 of chamber 10 and is secured in position by port 16. First housing 18 has another open end extending to a housing opening 26 of second housing 24. First window 20 is positioned in first housing 18 either in or near chamber 10. The first window may comprise a substantially transparent material capable of withstanding high temperatures, such as, for example, sapphire, quartz, or glass.

The first window is useful for shielding the soot when the temperature range is from about 400° to 600° C. because most hydrocarbons are maintained in the vapor phase at those temperatures. The first window is not hermetically sealed, but is held in position by an appropriate fastener. In one embodiment, the fastener comprises two rings 22 to keep the first window in the appropriate region of the first housing. Preferably a gasket (not shown) is between each ring and the first window to prevent the first window from breaking if slight shifts in position occur. The rings can be screwed or bolted to the first housing after the first window is inserted between them. Other potential fasteners include clamps, for example.

The fasteners do not hermetically seal the first window so that air exchange occurs through fasteners. The air exchange is important to prevent a large differential pressure build-up across the first window. Such pressure build-ups must be avoided because they can create explosions across the first window. In one embodiment, the first housing has one or more holes 36 in the vicinity of the first window surface facing the chamber to further permit air flow and help blow the first window clean.

The pressure seal for the optical sensor system is provided by second window 28 which is located at a distance from the first window. Preferably the distance ranges from about three to six-inches. The second window may comprise a substantially transparent material capable of withstanding high pressures, such as, for example, sapphire, quartz, or glass. The second window can also function as a lens.

The second window is situated outside of the high temperature regions and generally operates below 350° C. Therefore, brazing of the second window to the second housing with a brazing material 30 such as a nickel alloy can remain intact even with high differential pressure. If the second window is in an environment having a temperature below 150° C. and low pressure difference, inexpensive gasket sealing or a thick quartz window between rings or a clamp can sufficiently address safety concerns and a braze of the window to the housing is not required.

Optical sensor 32 preferably comprises a silicon carbide photodiode such as described in commonly assigned Brown et al., U.S. Pat. No. 5,394,005, which is herein incorporated by reference. Such diodes are able to withstand high temperatures and are exhibit high short-wavelength sensitivity, particularly in the ultraviolet spectrum.

In operation, radiation from environment 12 in chamber 10 passes through chamber opening 14, first window 10, a passageway 34 in first housing 18, and second window 26 to the optical sensor 32. Because the first window is not hermetically sealed, the pressure in the first housing is similar to the pressure in the chamber. Therefore the stress on first window 20 is minimized and does not pose a threat. Further, first window 20 is situated in or close enough to the chamber so that hydrocarbons are vaporized, thereby reducing the likelihood of soot buildup. The second window is far enough away so that the temperature is reduced and a hermetic seal is more easily maintained. Therefore optical sensor 32 has the protection of a first window which blocks and reduces soot build-up and a second window which is fully capable of withstanding the pressure of the chamber.

FIG. 2 is a sectional side view of another embodiment of the invention. FIG. 2 illustrates the use of rings 31 to position second window 28 and the fact that a single housing 19 can be used instead of first and second housings. FIG. 2 further illustrates that a portion of the optical sensor system can be situated in a flow sleeve 13 of a chamber. In a combustor, there is often a hollow area (flow sleeve 13) between two outer walls 10 and 11 of the combustion region 12. Air is passed through the hollow area for preheating and cooling purposes. If first window 20 is situated in a flow sleeve, as shown in FIG. 2, the first window must be sufficiently near to the combustion region to vaporize hydrocarbons in the vicinity of the first window.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for protecting an optical sensor, the apparatus comprising:

a housing having an open end;

first and second windows situated in the housing between the optical sensor and an outside environment, the first window being situated closer to the open end than the second window, the first window permitting air exchange between the outside environment and the second window, the second window being hermetically sealed to the housing.

2. The apparatus of claim 1, further including a fastener for holding the first window in position in the housing.

3. The apparatus of claim 2, wherein the fastener comprises a pair of rings.

4. The apparatus of claim 2, further including a brazing joint between the second window and the housing.

5. The apparatus of claim 1, wherein the housing comprises first and second housing parts, the first housing part including the first window, the second housing part including the second window, the first and second housing parts being welded together.

6. The apparatus of claim 1, wherein the housing has at least one hole in the vicinity of a surface situated between the first window and the outside environment.

7. The apparatus of claim 1, wherein the first and second windows comprise materials selected from the group consisting of sapphire, quartz, and glass.

8. The apparatus of claim 1, wherein the optical sensor comprises a silicon carbide photodiode.

9. The apparatus of claim 7, wherein the outside environment comprises a combustion region.

10. An optical sensor system comprising:

a housing having an open end;

first and second windows situated in the housing;

a fastener for situating the first window closer to the open end than the second window and permitting an air exchange between a sensing region and the second window;

a hermetic seal between the second window and the housing; and an optical sensor situated between the second window lo and a wall of the housing such that the air exchange does not occur inside the optical sensor.

11. The system of claim 10, wherein the optical sensor comprises a silicon carbide photodiode, and wherein the first and second windows comprise materials selected from the group consisting of sapphire, quartz, and glass.

12. The system of claim 11, wherein the sensing region comprises a combustion region.

13. The system of claim 12, further comprising a port for attaching the housing to a chamber surrounding the combustion region.

14. The system of claim 12, wherein the first window is positioned at a location in the housing sufficiently near enough to the combustion region that hydrocarbons are maintained in the vapor phase.

15. The system of claim 14, wherein the second window is situated a location sufficiently far enough from the combustion region that the hermetic seal is maintained.

* * * * *